United States Patent [19]
Gibb

[11] Patent Number: 6,057,053
[45] Date of Patent: May 2, 2000

[54] COMPRESSION ASSEMBLY FOR AN ELECTROCHEMICAL FUEL CELL STACK

[75] Inventor: Peter Robert Gibb, Coquitlam, Canada

[73] Assignee: Ballard Power Systems Inc., Burnaby, Canada

[21] Appl. No.: 08/976,990

[22] Filed: Nov. 25, 1997

[51] Int. Cl.[7] .................................................. H01M 8/02
[52] U.S. Cl. ................................................ 429/37; 429/35
[58] Field of Search .................................. 429/12, 34, 35, 429/36, 37, 38, 39

[56] References Cited

U.S. PATENT DOCUMENTS

| | | | |
|---|---|---|---|
| 3,573,104 | 3/1971 | Snyder, Jr. et al. | |
| 4,973,531 | 11/1990 | Zaima et al. | 429/37 |
| 4,997,728 | 3/1991 | Onoda et al. | 429/34 |
| 5,484,666 | 1/1996 | Gibb et al. | 429/34 |
| 5,686,200 | 11/1997 | Barton et al. | 429/37 |
| 5,716,503 | 2/1998 | Dean et al. | 204/270 |
| 5,789,091 | 8/1998 | Wozniczka | 429/12 |

FOREIGN PATENT DOCUMENTS

| | | |
|---|---|---|
| 0 104 892 | 4/1984 | European Pat. Off. |
| 60-093765 | 5/1985 | Japan . |
| 61-107669 | 5/1986 | Japan . |
| 1-48381 | 2/1989 | Japan . |
| 9-139224 | 5/1997 | Japan . |
| 9-270267 | 10/1997 | Japan . |
| WO 95/28010 | 10/1995 | WIPO . |

*Primary Examiner*—Marie Nuzzolillo
*Assistant Examiner*—Jonathan Crepeau
*Attorney, Agent, or Firm*—McAndrews, Held & Malloy, Ltd.

[57] ABSTRACT

An electrochemical fuel cell stack comprises a first end plate, a second end plate, and fuel cell assemblies interposed between the first and second end plates. The stack further includes a compression assembly comprising a compression mechanism and a restraining mechanism. The compression mechanism urges the first end plate towards the second end plate applying an internal compressive force to the fuel cell assemblies, even as the thickness of the fuel cell assemblies changes. The restraining mechanism prevents movement of the first end plate away from the second end plate by preventing deflection of the compression mechanism, which may occur, for example, when internal fluid pressure is increased.

21 Claims, 6 Drawing Sheets

COMPRESSION ASSEMBLY FOR AN ELECTROCHEMICAL FUEL CELL STACK

FIELD OF THE INVENTION

The invention relates generally to electrochemical fuel cells and, more particularly, to a compression assembly for an electrochemical fuel cell stack which applies internal compressive force to the fuel cell assemblies as the internal fluid pressure or fuel cell thickness changes.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes formed of porous, electrically conductive sheet material. The MEA includes a catalyst, typically in the form of finely comminuted platinum, at each membrane/electrode interface to induce the desired electrochemical reaction. The electrodes are electrically coupled to provide a path for conducting electrons between the electrodes through an external load.

In typical fuel cells, the MEA is disposed between two electrically conductive separator plates. The plates may have flow passages formed therein for directing the fuel and oxidant to the respective electrodes, namely, the anode on the fuel side and the cathode on the oxidant side. In a single cell arrangement, such fluid flow field plates are provided on each of the anode and cathode sides. The fluid flow field plates act as current collectors, provide fuel and oxidant to the respective anode and cathode surfaces, and provide channels for the removal of products, such as water, formed during operation of the cell.

Two or more fuel cells can be connected together, generally in series but sometimes in parallel, to increase the overall power output of the assembly. In typical series arrangements, one side of a given separator or fluid flow field plate serves as an anode plate for one cell and the other side of the plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing a fuel stream and an oxidant stream to the anode and cathode flow field channels. The stack also usually includes a manifold and inlet port for directing a coolant fluid, typically water, to interior channels within the stack to absorb heat generated by the operation of the fuel cell stack. The stack also generally includes exhaust manifolds and outlet ports for expelling unreacted fuel and oxidant streams and reaction products as well as an exhaust manifold and outlet port for coolant water exiting the stack.

Solid polymer fuel cells employing proton exchange membranes and stacks of such cells are compressed in order to improve electrical contact between cell components and to maintain the integrity of compression seals which keep the various fluid streams separate. During the lifetime of a stack, fuel cell thickness can change. For example, MEAs have a tendency to gradually decrease in thickness as a consequence of being subjected to compressive forces. The compression assembly for compressing the fuel cell assemblies preferably applies the desired internal compressive force while accommodating changes in fuel cell thickness. Traditional compression assemblies comprise springs and/or hydraulic pistons, employed either individually or in combination.

When a hydraulic piston is employed in a compression assembly, the fluid pushing on the piston can be an externally supplied fluid or one of the working fluids of the fuel cell stack. Springs are often used as a backup to provide a compressive force if the piston pressure is lost or inadequate for applying the desired internal compressive force for efficient and safe fuel cell operation. In either case, ideally the desired internal compressive force is applied to the fuel cell assemblies over the range of internal pressures attainable in an operational fuel cell stack. Unfortunately, the use of a hydraulic piston adds to the complexity of the fuel cell stack and is a source of unreliability with significant adverse consequences if the piston-based compression system fails. For example, such adverse consequences may include leakage, intermixing and/or contamination of the reactant fluids, chemical reactions between fluids and the fuel cell components, and/or degradation of fuel cell components.

Instead of hydraulic pistons, some conventional fuel cell stacks employ mechanical compression assemblies. For example, it is known to use compressed springs in conjunction with a retention device, such as tie rods or retention bands. The compressed springs expand, in response to reductions in the thickness of stack components, to continue to apply internal compressive force to the fuel cell assemblies.

Optimally, the compression assembly should impart a sufficient internal compressive force to ensure good electrical contact and sealing within the stack without detrimentally deforming the stack components. These requirements define the preferable operating range for the desired internal compressive force. Of course this operating range will vary depending upon the characteristics of the materials from which the stack is made.

The stiffness of the stack components is dependent upon the stiffness of the materials of each component in the stack. For example, the flow field plates may have a high spring rate (that is, a large force produces a small deflection), whereas the electrodes of the MEA typically have a low spring rate (that is, a large force produces a large deflection). The remaining components of the stack are generally stiff and thus have a high spring rate. The net result is that the stack components act as a spring with a varying spring rate, with the MEAs being the main contributor to the spring rate variability. In general, the spring rate of the stack components increases as the internal compression force increases.

Therefore, in a conventional fuel cell stack, the fuel cell stack components (acting like a spring) and the compression springs, act as two spring systems in balance. The substantially rigid stack retention device (for example, tie rods or retention bands) is held in tension and keeps the combined overall length of the stack substantially constant. Accordingly, deflection of the compression springs in either direction is matched by a corresponding deflection of other stack components, such as the fuel cell assemblies. As the compression springs compress, they decrease in length resulting in an increase in the spring force; the stack components simultaneously increase in thickness, resulting in a decrease in the internal compressive force.

In a conventional fuel cell stack, an increase in the internal stack fluid pressure may cause stack components to expand in thickness, resulting in a corresponding reduction in the internal compressive force. The magnitude of the reduction in internal compressive force depends upon the ratio of the stiffness of the stack components and the stiffness of the compression springs.

One approach to limiting reductions in the internal compressive force is to limit the internal stack fluid pressure.

This is an unacceptable solution in situations where it is desirable to use higher fluid pressures, for example, to improve fuel cell performance. Another approach to this problem is to increase the spring rate of the compression assembly to resist compression of the compression assembly, thereby reducing the magnitude of stack component expansion. By resisting stack component expansion, reductions in internal compressive force are also resisted. However, a disadvantage of increasing the spring rate of the compression assembly is that a small amount of stack component shrinkage will significantly reduce the remaining compressive force available from the spring. Therefore, in conventional compression assemblies, increasing the spring rate counteracts the primary function of the springs, namely, to deflect over a wide range to apply internal compressive force to the fuel cell assemblies as the fuel cell thickness changes.

In general, a problem with compressed springs is that as a compressed spring expands, its spring force declines, resulting in a deceasing ability to apply compressive force to the stack components. The decline in spring force can be reduced by using a spring having a lower spring rate. A spring with a low spring rate can be pre-compressed so that it will expand and continue to apply an internal compressive force as fuel cell thickness is reduced. Preferably the spring is selected so that the pre-compression force deflects the spring by an amount much greater than the anticipated amount of stack component shrinkage so that the spring will apply the desired internal compressive force throughout the service life of the fuel cell assembly. For example, disc springs (sometimes referred to as Belleville washers) can be made with a spring rate suitable for use in fuel cell compression assemblies.

Thus, in conventional fuel cell stacks the desire to have a low spring rate to accommodate stack component shrinkage, is balanced against the need for an infinite or very high spring rate to counter the effect of changes in internal stack fluid pressure on internal compressive force. In conventional fuel cells, a compromise is typically made between these two conflicting requirements by applying high pre-compression forces to mechanical compression assemblies and limiting stack fluid pressures. Accordingly, there is a need for a compression assembly which can be used over a wide spring deflection range without imposing limitations on the internal stack fluid pressures.

Therefore, the present fuel cell stack incorporates a compression assembly that has a lower spring rate in the stack compression direction and a higher or substantially infinite spring rate in the stack expansion direction.

A restraining mechanism for resisting stack component expansion is included as a part of the compression assembly. The restraining mechanism provides an expansion load path which bypasses the compression mechanism, substantially preventing deflection of the compression mechanism which would otherwise occur when the stack end plates are urged apart, for example, as the stack fluid pressure is increased. For example, in a compression assembly which uses springs to apply a compressive force, when the stack fluid pressures impose compressive forces on the compression assembly, a rigid member is engaged to substantially prevent compression of the springs and movement of the end plates apart. The restraining mechanism is preferably adjustable so that it is effective despite decreases in the distance between the end plates and corresponding deflections in the compression mechanism, such as would occur when there is a reduction in the thickness of the fuel cell assemblies.

SUMMARY OF THE INVENTION

An electrochemical fuel cell stack for producing electric power from a fluid fuel stream and a fluid oxidant stream comprises:

(a) a first end plate;
(b) a second end plate;
(c) a fuel cell assembly interposed between the first and second end plates;
(d) a compression assembly comprising:
   (1) a compression mechanism for urging the first end plate toward the second end plate thereby applying an internal compressive force to the fuel cell assembly; and
   (2) a restraining mechanism for substantially preventing movement of the first end plate away from the second end plate.

The restraining mechanism substantially prevents movement of the first end plate away from the second end plate by substantially preventing deflection of the compression mechanism in a direction which would allow movement of the first end plate away from the second end plate. For example, where the compression mechanism comprises one or more partially compressed springs, such as a plurality of disc springs, the restraining mechanism prevents compression of the springs, and where the compression mechanism is a resilient retention band, the restraining mechanism prevents the retention band from stretching. The restraining mechanism does not inhibit the compression mechanism from deflecting to respond to shrinkage which results in the movement of the first end plate toward the second end plate. Thus when there is a reduction in fuel cell thickness, the compression mechanism deflects to apply an internal compressive force to the fuel cell assemblies.

In preferred embodiments the fuel cell stack is a solid polymer fuel cell stack comprising a plurality of solid polymer fuel cells.

The restraining mechanism may be engaged intermittently and selectively to counteract forces which would otherwise cause the stack components to expand by deflecting the compression mechanism.

The fuel cell stack may include compression assemblies associated with one or both of the first and second end plates. Additionally, the compression assembly may comprise a plurality similar sub-assemblies spaced across the surface area of the end plate to improve the distribution of internal compressive force to the fuel cell assemblies.

Preferably, the restraining mechanism is adjustable to accommodate movement of the end plates towards each other and corresponding deflection of the compression mechanism. For example, if the thickness of the fuel cell assemblies decreases, the compression mechanism deflects as the end plates move towards each other and the restraining mechanism may be adjusted so that it still substantially prevents movement of the adjacent end plate away from the other end plate.

In preferred embodiments the restraining mechanism is engaged to cooperate with a stack retention device (which is preferably substantially rigid and of fixed length) whereby a load path is established from the adjacent end plate to the stack retention device through the restraining mechanism. Therefore, for the restraining mechanism to be positionable for engagement, the restraining mechanism preferably maintains its association with the adjacent end plate. Accordingly, the restraining mechanism is preferably adjustable so that part of the restraining mechanism can remain associated with the adjacent end plate. For example, the restraining mechanism may be associated with the retention device by threaded means so that the restraining mechanism can be rotated to move towards the end plate while the threaded connection maintains the association between the restraining device and the retention device.

Conveniently, the restraining mechanism only needs adjustment when a gap forms between the restraining mechanism and the end plate, at which time all of the compressive forces are carried by the compression mechanism. Therefore, very little force is required to rotate the restraining mechanism so that it is in contact or close to the end plate. Once the restraining mechanism is adjusted to be in contact with or close to the end plate, the restraining mechanism is in position to be engaged to substantially prevent compression of the spring and a detrimental decrease in internal compressive force.

The restraining mechanism has a spring rate higher than that of the compression mechanism. Preferably, the restraining mechanism is substantially rigid. That is, the restraining mechanism used for a given fuel cell has a substantially infinite spring rate (at least for the range of anticipated compressive loads for the particular fuel cell). Thus the restraining mechanism substantially prevents compression of the compression mechanism, thereby preventing the stack components from expanding (deflection of the retention device is preferably negligible).

In one embodiment, a compression mechanism comprises a plurality of stacked disc springs and the restraining mechanism comprises a rigid load ring which circumscribes the stacked disc springs. The disc springs are interposed between one of the end plates and a load disc held in place by a stack retention device such as a bolted tie rod or retention band. The load ring has a threaded inner circumferential surface which cooperates with a threaded outer circumferential surface of the load disc. Rotation of the load ring moves it toward the adjacent end plate. The load ring contacts to prevent compression of the plurality of disc springs. The end plate may comprise a load plate component to improve the distribution of compressive force to the fuel cell assemblies.

The rotation of the load ring may be done manually, for example, at periodically scheduled maintenance checks or automatically, using an apparatus for continuously applying a rotary force to the load ring to prevent any gap from forming between the load ring and the load plate. When the first end plate moves towards the second end plate, the restraining mechanism adjusts in coordination with movement of the first end plate to maintain contact between the load ring and the first end plate.

The restraining mechanism prevents movement of the end plates apart to the extent necessary to prevent internal fluid pressure from expanding the stack components and compromising the internal compressive force needed to ensure good electrical contact and the integrity of fluid seals. When not so engaged, the restraining mechanism is preferably only in light contact with the first end plate and the majority of compressive force is applied to the fuel cell assemblies by the compression mechanism. Alternatively, the apparatus may maintain a fixed small spacing between the first end plate and the restraining mechanism until the stack components expand and the end plates move apart slightly to engage the restraining mechanism.

The apparatus for automatically applying a rotary force may, for example, comprise a resilient member which applies a continuous rotational force or torque to urge the load ring toward the adjacent end plate.

In another embodiment, instead of a load ring, the restraining mechanism comprises a plurality of wedge members extending within the gaps formed between adjacent disc springs. A perimeter spring member circumscribes the wedge members, and the perimeter spring member imparts inward radial force to urge the wedge members into the gaps between the adjacent disc springs. The wedge members resist compression of the springs but permit expansion of the disc springs to accommodate reductions in fuel cell thickness.

A method for compressing one or more fuel cell assemblies between first and second end plates in an electrochemical fuel cell stack comprises:

1. urging the first end plate towards the second end plate to apply an internal compression force to the fuel cell assemblies using a mechanical compression mechanism; and 2. engaging a restraining mechanism to substantially prevent movement of the first end plate away from the second end plate and deflection of the mechanical compression mechanism in the stack component expansion direction.

The preferred method further comprises the step of adjusting the position of the restraining mechanism in response to movement of the first end plate towards the second end plate.

It is to be noted, however, that the appended drawings illustrate preferred embodiments of the invention and are therefore not to be considered limiting of its scope.

DETAILED DESCRIPTION OF THE PREFERRED EMBODIMENTS

Figure 1:
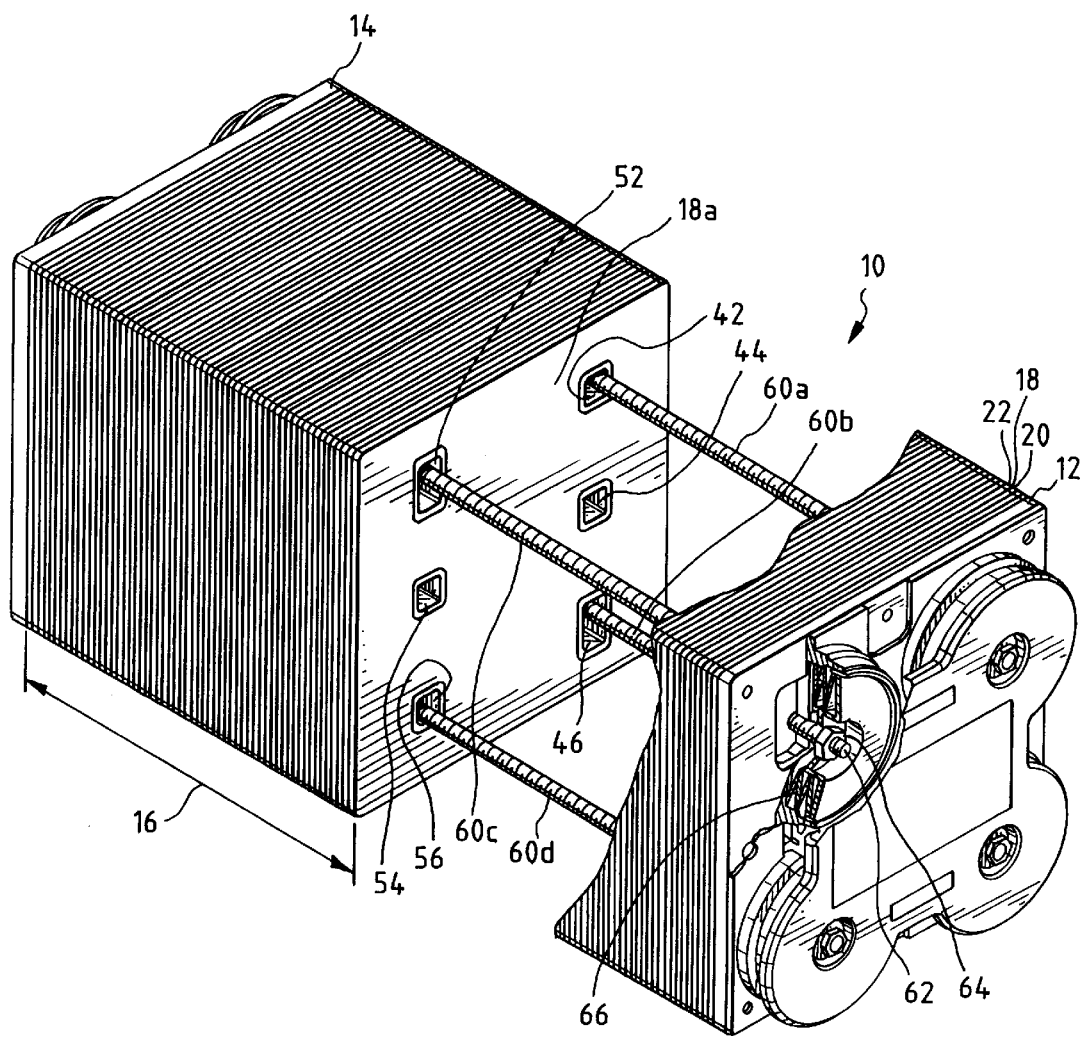
FIG. 1 is a perspective view of an embodiment of an electrochemical fuel cell stack with a compression assembly comprising an adjustable restraining mechanism.

Turning first to FIG. 1, an electrochemical fuel cell stack 10 includes a plurality of fuel cell assemblies, a series of which are designated as fuel cell assemblies 16 in FIG. 1.

Each of fuel cell assemblies 16 includes a membrane electrode assembly 18 interposed between a pair of fluid flow field plates 20, 22. Fuel cell stack 10 also includes a first end plate 12, which is a compression end plate in FIG. 1, and a second end plate 14, which is a manifold end plate in FIG. 1.

In FIG. 1, the revealed portion of the stack shows that a typical membrane electrode assembly 18a has a plurality of openings formed therein, which cooperate with corresponding openings in adjacent layers to form internal manifolds for directing reactant and coolant streams through stack 10. Opening 42 corresponds to a fuel inlet manifold for directing and introducing a fuel stream to each of the MEAs in stack 10. Opening 44 corresponds to a coolant inlet manifold for directing and introducing a fluid coolant stream to coolant plate assemblies (not shown) in stack 10. Opening 46 corresponds to an oxidant inlet manifold for directing and introducing an oxidant stream to each of the MEAs in stack 10.

Similarly, opening 52 corresponds to an oxidant outlet manifold for collecting, directing and exhausting the reacted oxidant stream from each of the MEAs in stack 10. Opening 54 corresponds to a coolant outlet manifold for collecting, directing and exhausting the coolant fluid stream from coolant plate assemblies in stack 10. Opening 56 corresponds to a fuel outlet manifold for collecting, directing and exhausting the reacted fuel stream from each of the MEAs in stack 10.

The inlet fuel, coolant and oxidant streams are introduced to stack 10 via inlet ports in manifold end plate 14. The outlet fuel, coolant and oxidant streams are exhausted from stack 10 via outlet ports (not shown) also in manifold end plate 14.

Tie rods 60a, 60b, 60c, 60d or equivalent retention devices, hold the stack components together. In FIG. 1 tie rods 60a, 60b, 60c, 60d, extend through manifold openings 42, 46, 52, 56, respectively, as well as through openings in compression end plate 12 and in manifold end plate 14. The tie rods are threaded at each of their opposite ends, as shown, for example, by threaded portion 62 of tie rod 60c. Tie rods 60a, 60b, 60c, 60d have fastening means, one of which is shown in FIG. 1 as threaded nut 64, disposed at their opposite ends.

Figure 5:
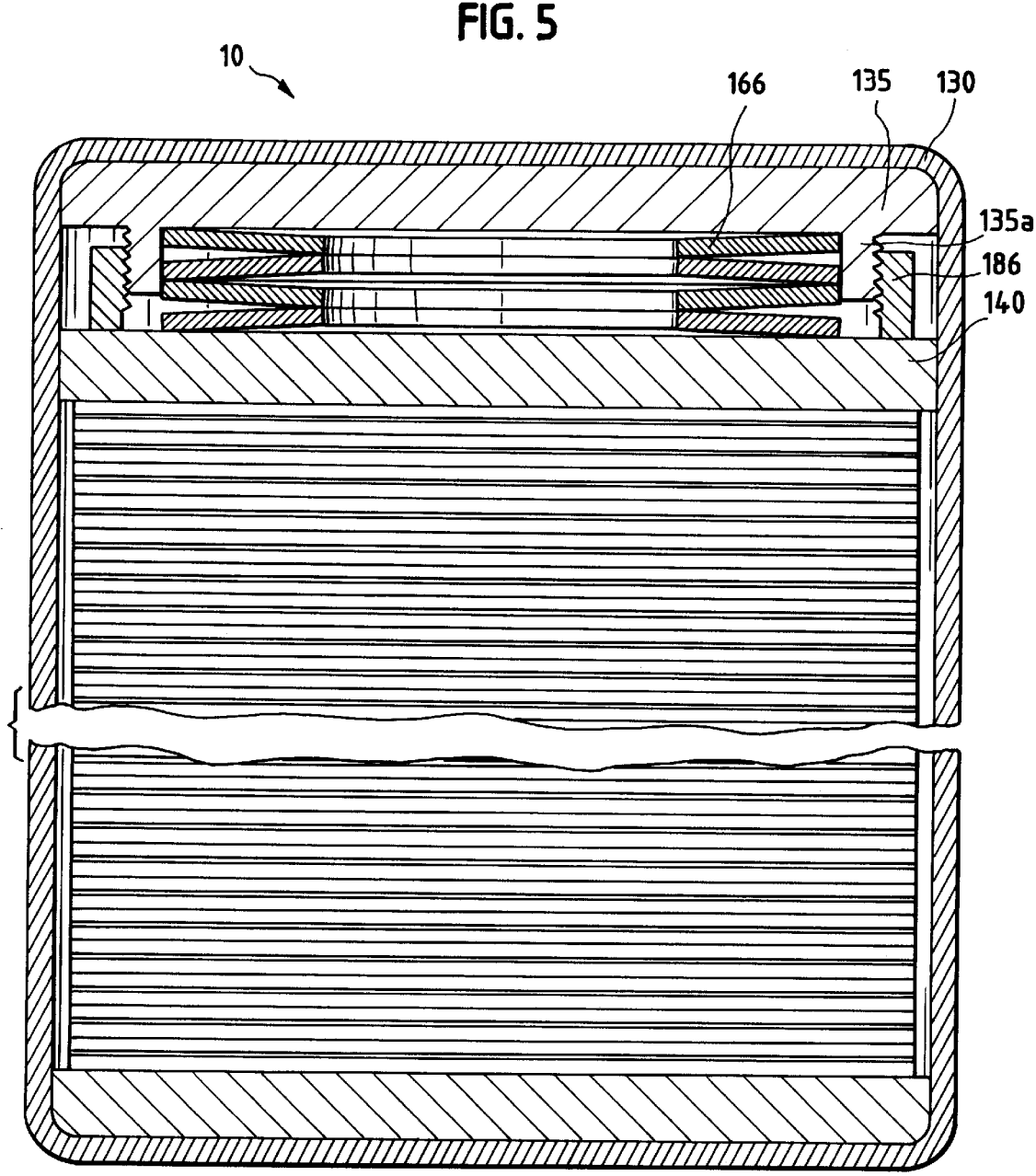
FIG. 5 is a side sectional view of an embodiment of an electrochemical fuel cell stack compression assembly wherein the compression mechanism comprises disc springs, the restraining mechanism comprises a load ring, and the retention device is a retention band longitudinally circumscribing the stack.

Alternatively, tie rods could be positioned around the perimeter of the fuel cells without extending through openings therein, or, retention bands 130 could be used instead of tie rods (see FIG. 5). Those skilled in the art will appreciate that the present compression assembly may be combined with other retention means for holding stack 10 together in its assembled state.

Figure 2:
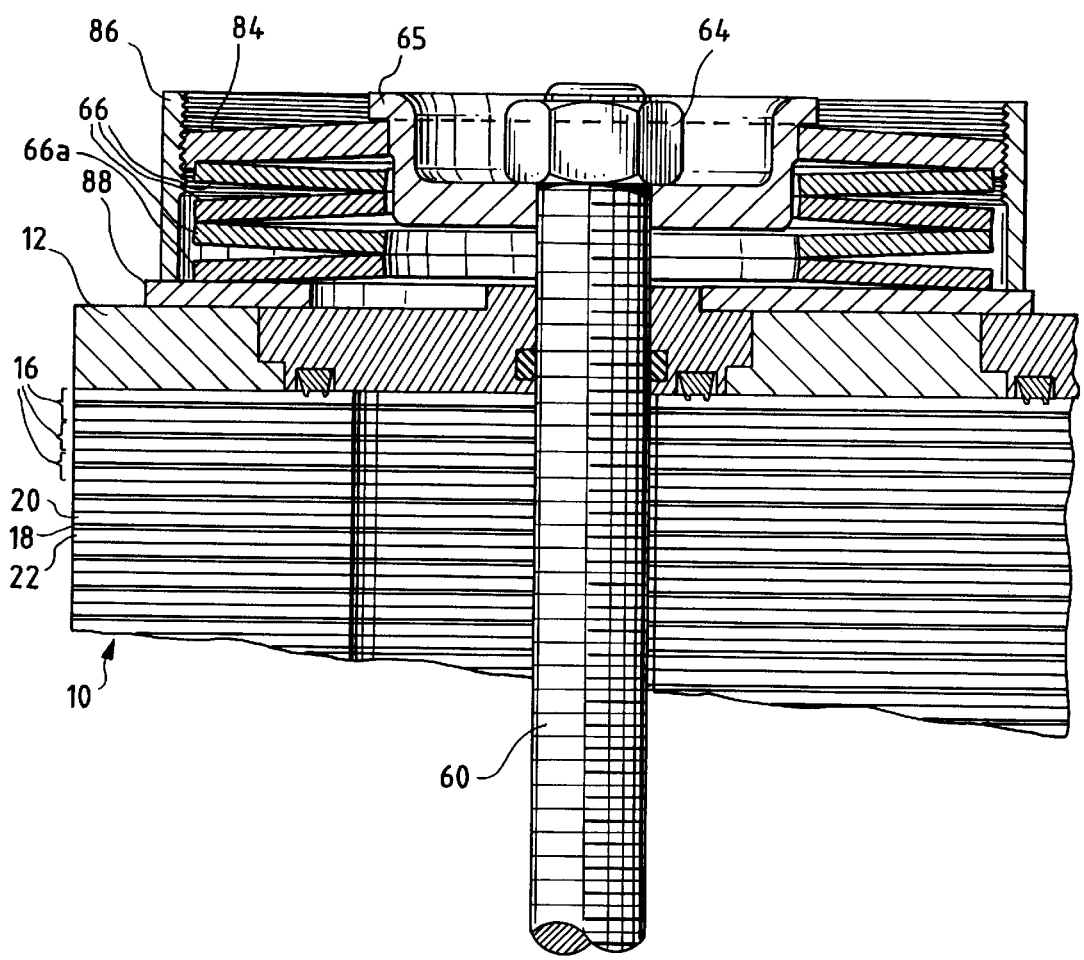
FIG. 2 is a side sectional view of a similar compression assembly to that of the electrochemical fuel cell stack of FIG. 1, which includes a compression mechanism comprising a plurality of disc springs for compressing the fuel cell assemblies, and an adjustable restraining mechanism comprising a load ring circumscribing the disc springs for preventing compression of the disc springs.

A compression assembly suitable for use with stack 10 is illustrated in FIG. 2 which shows a side sectional view of an assembly associated with one of the four tie rods 60. Tie rod 60 passes through a collar 65 which is fitted within a central opening of load disc 84. Alternatively, as shown in FIG. 1, collar 65 and load disc 84 could be fabricated as a single component. Tie rod 60 also passes through central openings in a stack of partially compressed disc springs 66 interposed between load disc 84 and compression end plate 12. The disc springs 66 cooperate with load disc 84, collar 65 and threaded nut 64 on tie rod 60 to serve as a compression mechanism to urge compression end plate 12 towards manifold end plate 14 thereby applying compressive force to fuel cell assemblies 16 interposed between the end plates, 12, 14. Spring 66a may contact compression end plate 12 directly, or indirectly through, for example, a load distribution plate 88, as shown in FIG. 2. Over time, if the thickness of the fuel cell assemblies decreases, the compression mechanism expands and continues to exert a compressive force on fuel cell assemblies 16 by urging compression end plate 12 towards end plate 14. Disc springs 66 are preferred because of their high load capacity, compact size, and the potential to modify the spring rate profile. A preferred embodiment has stacked, multiple disc springs 66 arranged in series to increase the range of deflection.

The compression assembly also comprises an adjustable restraining mechanism to substantially prevent compression end plate 12 from moving away from manifold end plate 14 in assembled fuel cell stack 10. In the embodiment illustrated in FIG. 2, a cylindrical load ring 86 circumscribes stacked disc springs 66. Load ring 86 has a threaded inner circumferential surface which screws onto the outside of threaded load disc 84 and extends downwardly to make contact with load distribution plate 88 mounted on compression end plate 12. Load ring 86 cooperates with load disc 84, collar 65 and threaded nut 64 on tie rod 60 to serve as a restraining mechanism to prevent compression end plate 12 from moving away from manifold end plate 14.

If only a light contact is made between load ring 86 and load distribution plate 88, then virtually all of the compressive load on the fuel cell assemblies of stack 10 will be applied by springs 66. In this configuration, there are two potential load paths which are effective in opposite directions, through springs 66 for compression, and the other through load ring 86 for expansion.

If the thickness of fuel cell assemblies tends to increase, for example, because the internal fluid pressure in them is increased, the expansion load on end plate 12 is directed through load ring 86, which is substantially rigid and does not permit springs 66 to compress. End plate 12 is thus restrained from moving away from end plate 14 (the amount of stretch in tie rod 60 is negligible), and the internal compressive load in fuel cell assemblies 16 (applied by springs 66) remains substantially constant. If a restraining mechanism was not present, as in conventional fuel cells, an increase in fluid pressure inside fuel cell assemblies 16 may compress springs 66, thus undesirably changing the compressive force on the fuel cell assemblies.

The primary purpose of the compression mechanism comprising springs 66, is to apply a compressive force to the fuel cell assemblies of stack 10 throughout its service life, even if there is a reduction in their thickness. A reduction in the thickness of fuel cell assemblies 16 results in movement of end plate 12 towards end plate 14, which may cause load ring 86 to loose contact with load distribution plate 88. For load ring 86 to prevent movement of end plate 12 away from end plate 14 (and thereby prevent compression of springs 66 and a change in compressive force on the fuel cell assemblies 16), load ring 86 must maintain effective (direct or indirect) contact with end plate 12. In the embodiment illustrated in FIG. 2 the restraining mechanism is adjustable by virtue of the threaded connection between load ring 86 and load disc 84. Load ring 86 may be screwed downwardly in FIG. 2 towards end plate 12.

Thus, the position of load ring 86 is adjustable to so that it may be engaged to prevent movement of end plate 12 away from end plate 14.

Manifold end plate 14 may also have an associated compression assembly (not shown in FIG. 1) for applying a compressive force to fuel cell assemblies 16.

Figure 3:
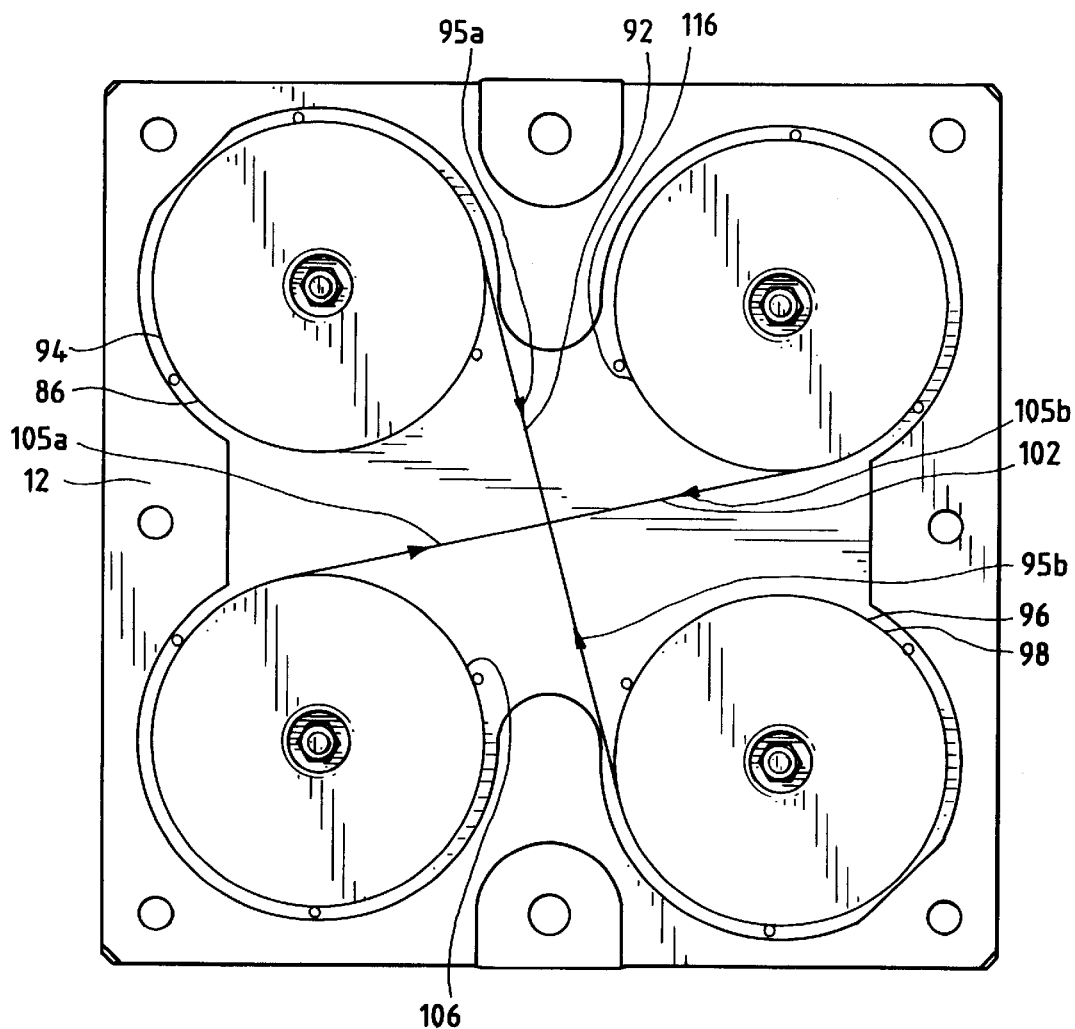
FIG. 3 is an end elevation view of an electrochemical fuel cell stack with a self-adjusting restraining mechanism comprising an apparatus for applying a tangential load to each of four load rings to automatically rotate the load rings into contact with the compression end plate.

FIG. 3 illustrates an embodiment of the compression mechanism of FIG. 2 in which the restraining mechanism is self-adjusting. The compression mechanism comprises an apparatus for automatically rotating load ring 86. A spring 92 is attached at one end to load ring 86 at point 94 such that spring 92 applies a tangential force or torque (illustrated in FIG. 3 by arrows 95a, 95b) to load ring 86, causing it to rotate. The other end of spring 92 can be attached to a convenient location on end plate 12 or it can be attached to another load ring 96 at point 98, so that the same spring 92 can rotate two load rings 86, 96. To reduce the length of rotation spring 92, the threads on load ring 86 and load disc 84 preferably have a coarse pitch, thereby implying a multi-start thread.

FIG. 3 also illustrates a further spring 102 attached to a third and fourth load rings 106 and 116 such that spring 102 applies a tangential force (illustrated by arrows 105a, 105b) to both load rings 106, 116.

Figure 4:
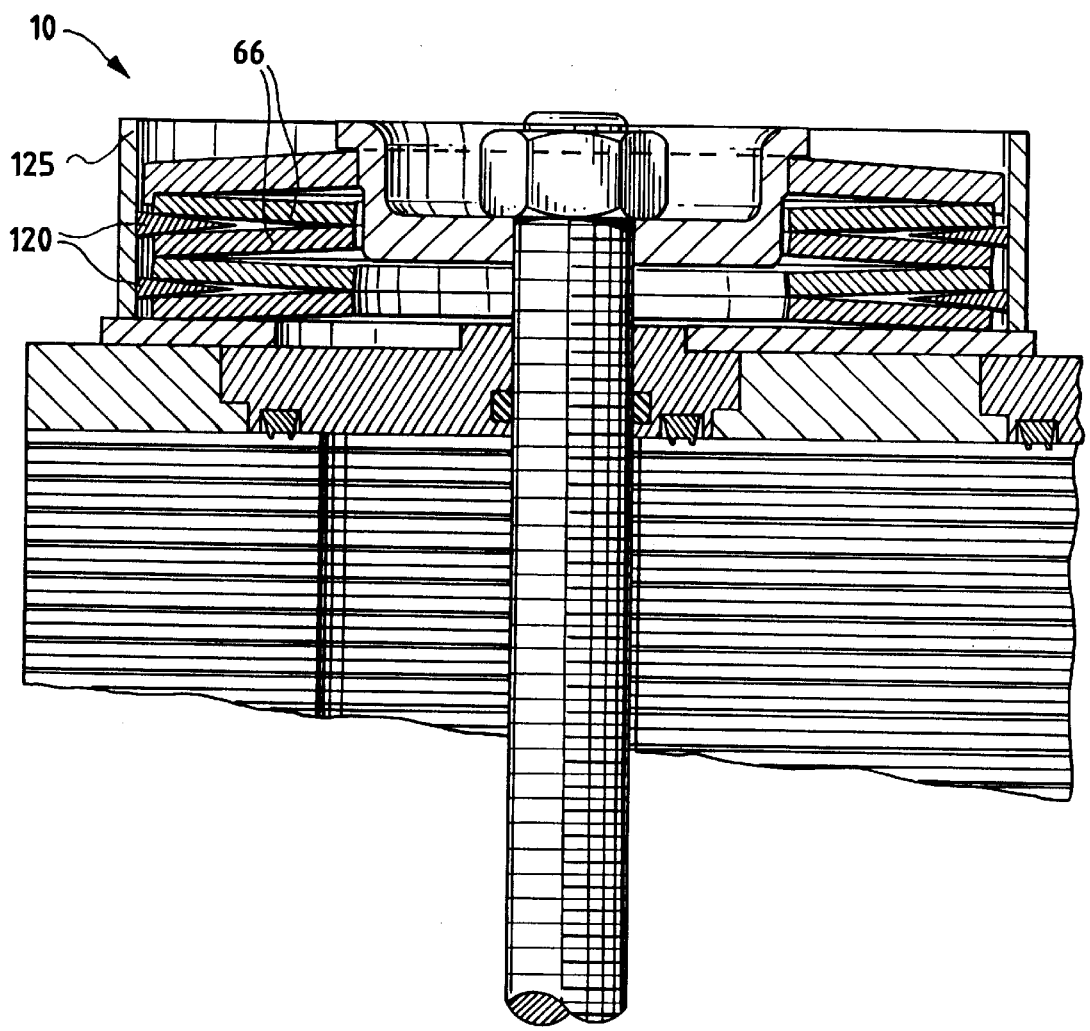
FIG. 4 is a side sectional view of an embodiment of an electrochemical fuel cell stack compression assembly wherein the compression mechanism comprises disc springs and a self-adjusting restraining mechanism which comprises wedges which are urged into the spaces between the disc springs to prevent the disc springs from being compressed.

Another embodiment of a self-adjusting restraining mechanism for preventing compression of springs 66 is depicted in FIG. 4. In this embodiment, a perimeter spring band 125 circumscribing stacked disc springs 66 provides inward radial force to move wedges 120 into the gaps between springs 66. Any force tending to move the end plates apart and compress springs 66 is transmitted through wedges 120, substantially rigid spring band 125 and the periphery of springs 66, thereby preventing compression of springs 66. When stack components change in thickness and/or stack 10 has no internal pressure, springs 66 will expand and the gaps between springs 66 will increase in size. Wedges 120 will them be urged into the enlarged gap by spring band 125, thereby maintaining the expansion load path through the spring edges and wedges 120.

FIG. 5 is a side sectional view of another embodiment of a fuel cell stack comprising a compression assembly with a restraining mechanism for preventing the end plates from moving apart. In FIG. 5, the retention device is a retention band 130 which longitudinally circumscribes stack 10. In this embodiment, a stack of partially compressed disc springs 166 are interposed between a pair of plates 135 and 140. The disc springs 166 cooperate with plate 135 and retention band 130 to serve as a compression mechanism to urge compression end plate 140 towards end plate 150 thereby applying compressive force to fuel cell assemblies interposed between the end plates, 140, 150. A threaded load ring 186 cooperates with a threaded rigid member 135a on plate 135 and retention band 130, to serve as a restraining mechanism to prevent compression end plate 140 from moving away from end plate 150. As will be apparent to those skilled in the art, FIG. 5 illustrates that with only minor modifications a compression assembly with a retaining mechanism, according to the invention can be employed with different types and configurations of retention devices.

Figure 6:
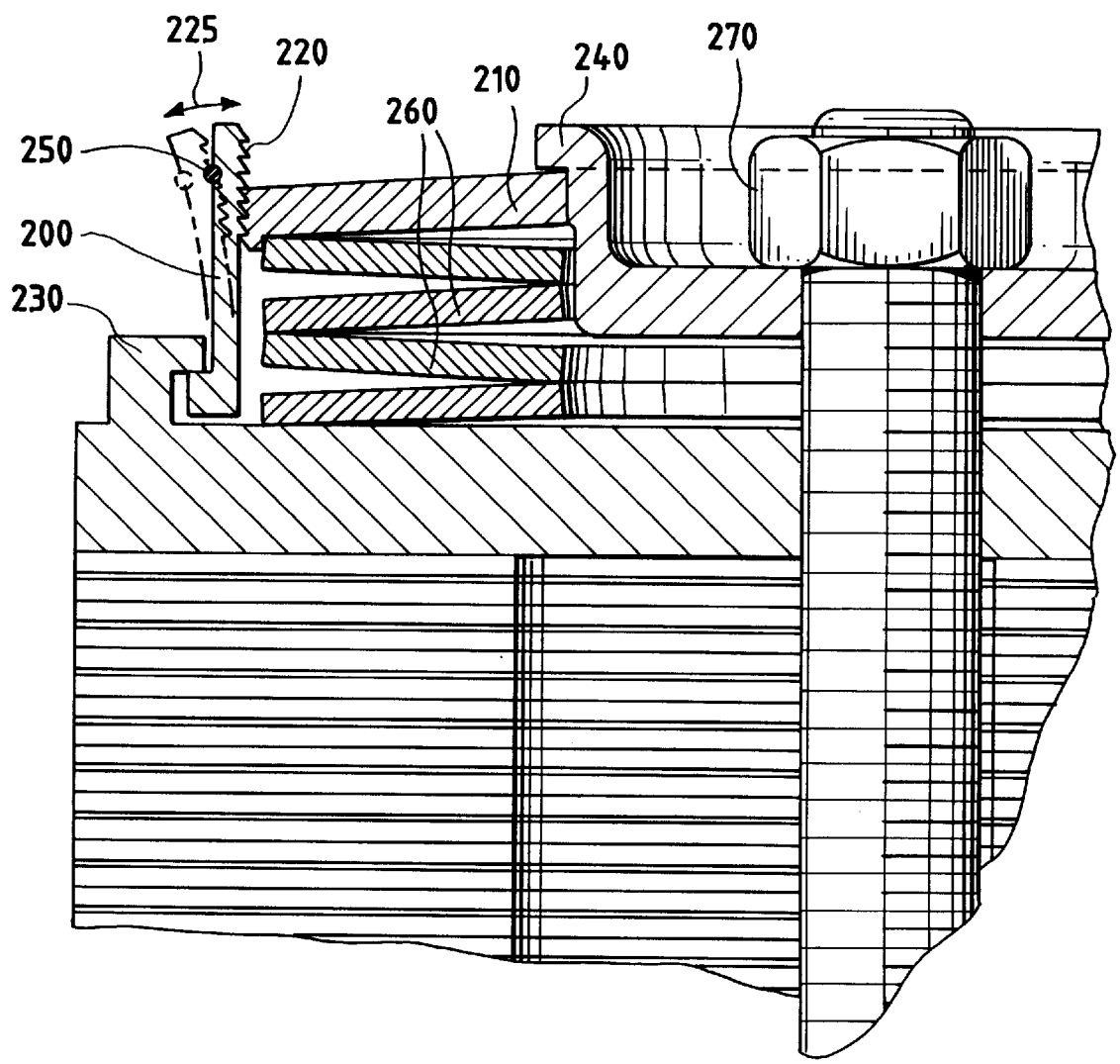
FIG. 6 is a side sectional view of an embodiment of an electrochemical fuel cell stack compression assembly wherein the compression mechanism comprises disc springs and an adjustable restraining mechanism comprises a segmented load ring having teeth which engage with corresponding teeth on the outer circumferential surface of a load disc.

Another embodiment of a compression assembly comprising an adjustable restraining mechanism for is depicted in FIG. 6. A load ring 200 may be made with slits formed in the ring such that the ring is cut into multiple segments. The segments may be completely separate or attached at one rim of load ring 200. Load ring 200 cooperates with load disc 210, collar 240 and threaded nut 270 on the tie rod to serve as a restraining mechanism to prevent the end plates from moving apart. In this embodiment, instead of a threaded connection between load ring 200 and load disc 210, there are teeth 220 on the interfacing surfaces between these two components. Teeth 220 engage when plate 230 is urged towards threaded nut 270. When load ring 200 is not transmitting compressive forces to fuel cell assemblies 16, the slits permit the segments to tilt or flex away from load disc 210, disengaging teeth 220. The direction of the tilting movement is represented by arrow 225 in FIG. 6 and the deflected load ring segment shown in broken lines. Load ring 200 may cooperate with end plate 230 so that movement of the end plates towards each other causes corresponding movement of load ring 200, rendering the restraining mechanism self-adjusting.

Teeth 220 may be designed with a profile which is flat on one side to bear the load and angled on the other side to allow teeth 220 to slide past one another when not under load, similar to a rachet. The force to hold the load ring segments in contact with load disc 210 can be provided either by a circumferential spring band 250 around load ring 200 or by having the segments joined together at the base so that the load ring 200 acts like a collet. This tooth configuration is not limited to the exterior of the load disc 210; it can be incorporated into the center hole of the disc springs 260 and especially at the location of the tie rod fastener 270.

Additionally, while the illustrated embodiments depict disc springs as preferred components in the compression mechanism, other types of springs may be employed with similar results.

Similarly, while particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack for producing electric power from a fluid fuel stream and a fluid oxidant stream, said stack comprising:
   (a) a first end plate;
   (b) a second end plate;
   (c) at least one fuel cell assembly interposed between said first and second end plates;
   (d) a compression assembly comprising:
      (1) a rigid retention device associated with said first and second end plates, said retention device limiting the overall length of said stack;
      (2) a compression mechanism which cooperates with said retention device to urge said first end plate toward said second end plate, thereby applying internal compressive force to said at least one fuel cell assembly; and
      (3) a restraining mechanism comprising at least one rigid member which is movable relative to said rigid retention device, to engage said first end plate to provide a load path between said rigid retention device and said first end plate, whereby said restraining mechanism substantially prevents deflection of said compression mechanism when said deflection would allow movement of said first end plate away from said second end plate, thereby substantially preventing said movement.

2. The electrochemical fuel cell stack of claim 1 wherein said compression mechanism comprises at least one compressed spring which expands when there is a reduction in the thickness of said at least one fuel cell assembly.

3. The electrochemical fuel cell stack of claim 1 wherein said compression mechanism comprises a plurality of stacked disc springs.

4. The electrochemical fuel cell stack of claim 3 wherein said retention device comprises a load disc that provides a fixed support for said compression mechanism, and said rigid member comprises a load ring which circumscribes said plurality of stacked disc springs, and said load disc further comprises a threaded outer circumferential surface which cooperates with a threaded inner circumferential surface of said load ring such that rotation of said load ring moves said load ring in relation to said first end plate.

5. The electrochemical fuel cell stack of claim 4 wherein said retention device further comprises at least one tie rod.

6. The electrochemical fuel cell stack of claim 4 wherein said compression assembly further comprises an apparatus for moving said load ring towards said first end plate when a gap is formed between said load ring and said first end plate.

7. The electrochemical fuel cell stack of claim 6 wherein said apparatus for moving said load ring comprises a resilient member having a pair of opposite ends, one of said ends attached to an outer circumferential surface of said load ring, the other of said ends attached to said first end plate such that said resilient member applies a continuous rotational force to urge said load ring toward said first end plate.

8. The electrochemical fuel cell stack of claim 7 wherein said apparatus for rotating said load ring comprises a coiled spring attached to said first end plate, said spring imparting a tangential force on an outer circumferential surface of said load ring to urge said load ring toward said first end plate.

9. The electrochemical fuel cell stack of claim 3 wherein said retention device comprises at least one retention band that circumscribes said first end plate, said second end plate, and said at least one fuel cell assembly.

10. The electrochemical fuel cell stack of claim 9 wherein said compression assembly further comprises a plate that cooperates with said compression mechanism and said restraining mechanism for applying a compressive force to said at least one fuel cell assembly and said first and second end plates.

11. The electrochemical fuel cell stack of claim 10 wherein said rigid member comprises a load ring that encircles said disc springs.

12. The electrochemical fuel cell stack of claim 3 wherein:
   said retention device comprises a load disc that provides a fixed support for said compression mechanism;
   said rigid member comprises a segmented load ring which circumscribes said plurality of stacked disc springs;
   grooves forming a first set of teeth on an outer circumferential surface of said load disc; and
   grooves forming a second set of teeth on an inner circumferential surface of said segmented load ring, whereby said first and second sets of teeth are engageable;
whereby said segmented load ring is moveable towards said first end plate by tilting segments of said load ring to disengage said first and second sets of teeth.

13. The electrochemical fuel cell stack of claim 12 wherein said load ring cooperates with said first end plate so that movement of said first end plate causes corresponding movement of said load ring, thereby rendering said restraining mechanism self-adjusting.

14. The electrochemical fuel cell stack of claim 1 wherein said compression mechanism comprises a plurality of stacked disc springs interposed between said retention device and said first end plate, and said restraining mechanism comprises a plurality of wedge members extending within gaps formed between adjacent disc springs, and said restraining mechanism further comprises a perimeter spring member circumscribing said wedge members, said perimeter spring member imparting inward radial force to urge said wedge members into said gaps between adjacent disc springs.

15. The electrochemical fuel cell stack of claim 1 wherein said compression mechanism comprises a first compression mechanism associated with said first end plates, and said restraining mechanism comprises a first restraining mechanism associated with said first end plate; said stack further comprising:
   a second compression mechanism which cooperates with said retention device to urge said second end plate toward said first end plate, thereby applying internal compressive force to said at least one fuel cell assembly; and
   a second restraining mechanism which cooperates with said retention device to substantially prevent deflection of said second compression mechanism, when said deflection would allow movement of said second end plate away from said first end plate, thereby substantially preventing said movement.

16. The electrochemical fuel cell stack of claim 1 wherein said stack is a solid polymer fuel cell stack.

17. The electrochemical fuel cell stack of claim 1 wherein said load path is substantially linear.

18. The electrochemical fuel cell stack of claim 1 wherein said restraining mechanism is a unitary structure.

19. A method for compressing an electrochemical fuel cell stack comprising at least one fuel cell assembly interposed between first and second end plates, said method comprising:
   urging said first end plate towards said second end plate to apply internal compression force on said at least one fuel cell assembly using a mechanical compression mechanism, which cooperates with a rigid retention device; and
   engaging a restraining mechanism comprising at least one rigid member which is moveable relative to said rigid retention device to provide a load path between said rigid retention device and said first end plate to substantially prevent deflection of said compression mechanism when said deflection would allow movement of said first end plate away from said second end plate, thereby substantially preventing said movement.

20. The method of claim 19 wherein the position of said restraining mechanism is adjusted in response to movement of said first end plate towards said second end plate.

21. The method of claim 20 wherein the position of said restraining mechanism is adjusted automatically whenever said first end plate moves towards said second end plate.

* * * * *